United States Patent [19]
Meyers

[11] 3,893,486
[45] July 8, 1975

[54] ACCUMULATOR WITH TEMPERATURE COMPENSATION

[75] Inventor: Robert E. Meyers, South Bend, Ind.

[73] Assignee: The Bendix Corporation, South Bend, Ind.

[22] Filed: May 16, 1973

[21] Appl. No.: 360,705

[52] U.S. Cl. ............................................... 138/31
[51] Int. Cl. ........................................... F16l 55/04
[58] Field of Search .............. 138/26, 30, 31; 92/1; 73/392, 393

[56] References Cited
UNITED STATES PATENTS

| 912,502 | 2/1909 | Squires | 138/31 |
|---|---|---|---|
| 2,324,217 | 7/1943 | Knauth | 73/393 |
| 2,764,998 | 10/1956 | McCuistion | 138/31 |

Primary Examiner—Charles A. Ruehl
Attorney, Agent, or Firm—Ken C. Decker; William N. Antonis

[57] ABSTRACT

A vessel for storing fluid under pressure includes a housing having a chamber in one end thereof into which concentric pistons of differential areas are urged by resilient means. Admission of fluid under pressure to the chamber acts on the differential areas of the pistons moving them simultaneously against the resilient means until the pressure and volume of fluid respectively, each attains a first predetermined value, at which time the pistons are held against further movement, with the piston having the larger area being held against a fixed stop and the piston having the smaller area being held by the resilient means up to a second predetermined value of chamber pressure which represents the maximum fluid working pressure of the system to which the vessel is connected. Any pressure increase in the chamber above the second predetermined value, due to fluid expansion caused by temperature increase, is effective across the differential area between the concentric pistons so that as the chamber pressure exceeds the second predetermined pressure value the piston with the smaller area will move against the resilient means to compensate for volumetric increase.

10 Claims, 3 Drawing Figures

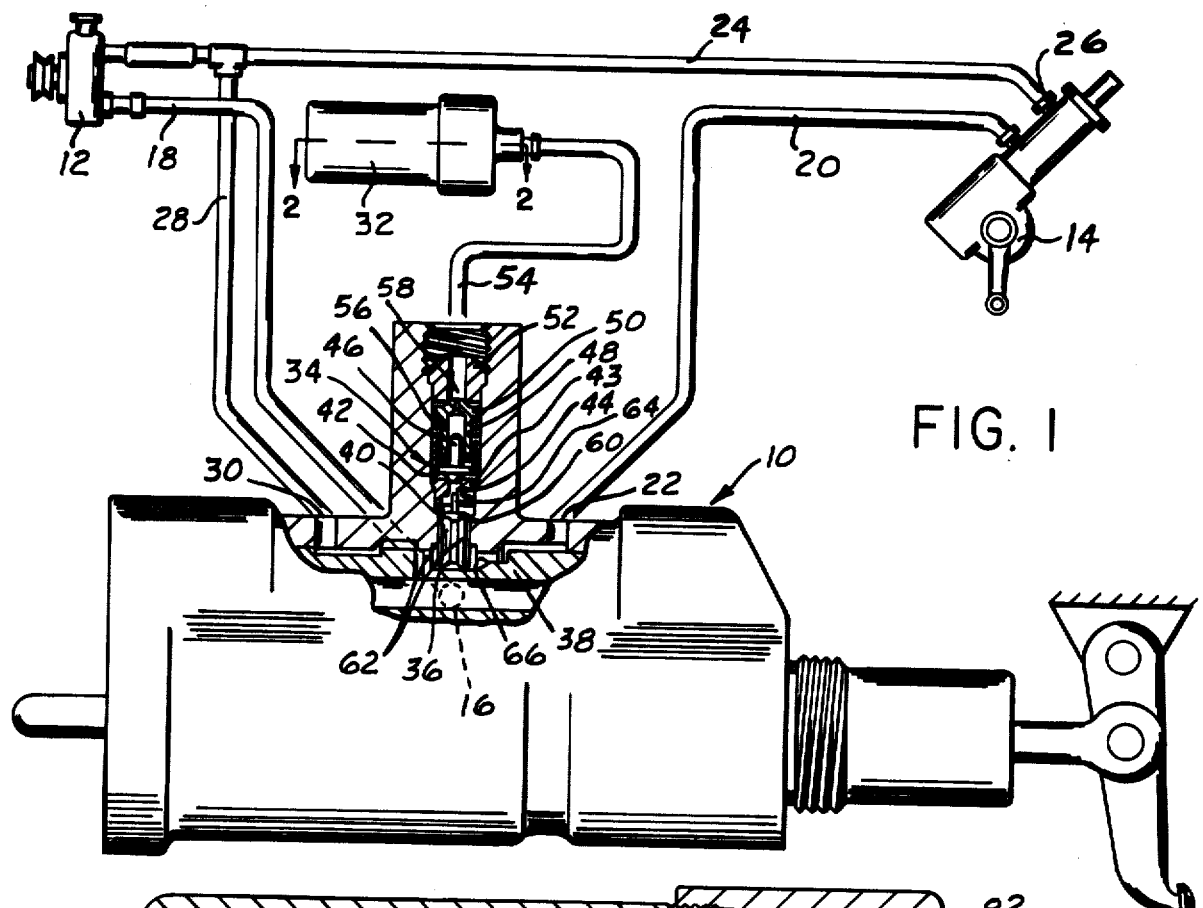
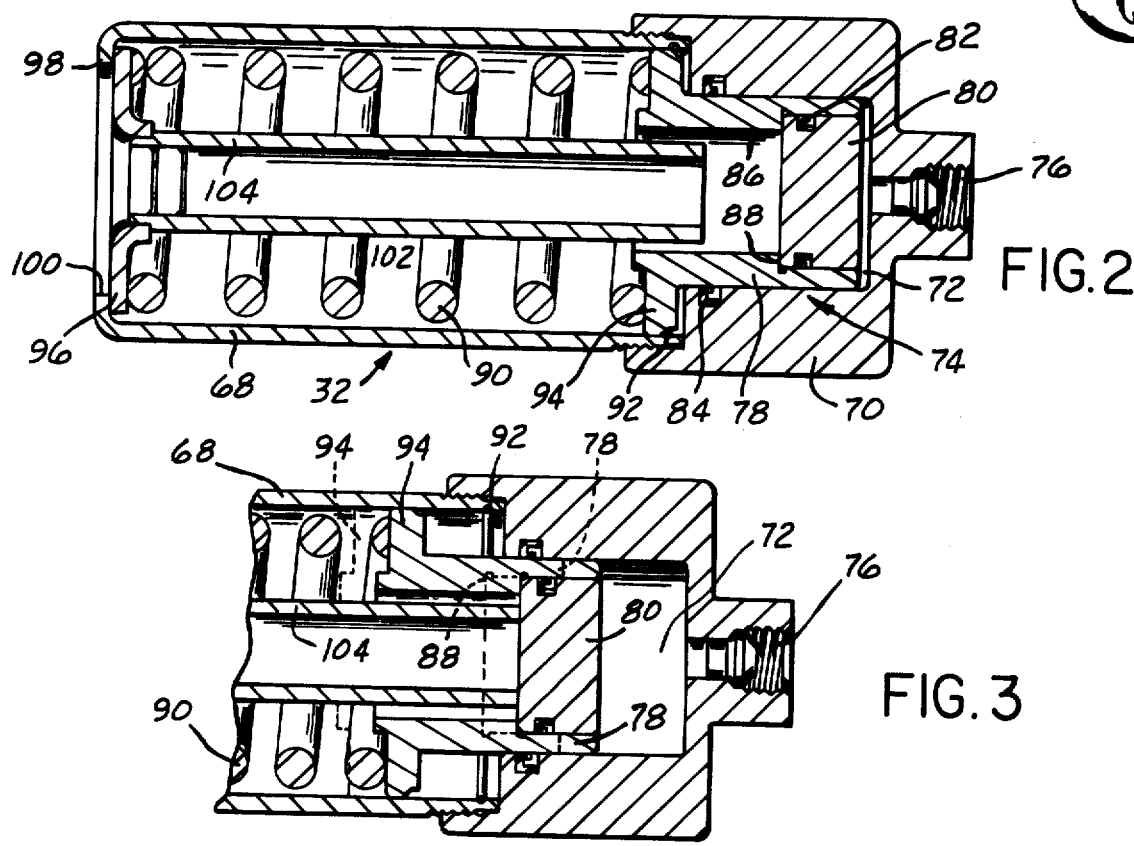

ACCUMULATOR WITH TEMPERATURE COMPENSATION

BACKGROUND OF THE INVENTION

The invention relates to pressure vessels or accumulators for storing and releasing fluid under pressure and more particularly to vessels of this type which are used as an auxiliary fluid source to operate vehicle power steering devices and power brake boosters in the event the primary source of fluid is inadequate.

In view of the stringent safety regulations now being proposed for automotive vehicle equipment, it is quite evident that certain design and performance changes in hydraulic power boost devices will have to be made to upgrade reliability and promote unreserved acceptance of such devices in the industry. Hydraulic brake boosters are generally a component part of the vehicle's hydraulic power steering system in which the pressurized fluid for operating the booster is developed by the engine driven pump. Any malfunction in the main hydraulic system, making the pressurized fluid unavailable during a brake application, could result in an accident. To minimize this eventuality, brake boosters are provided with auxiliary fluid sources to assist the operator in applying the brakes should there be a fluid pressure failure. This auxiliary fluid power may be a separate and complete dual system with independent pumps, etc., as illustrated in U.S. Pat. No. 3,677,607, or on the other hand the auxiliary source may consist of an accumulator connected into the main hydraulic system to be charged during normal pump operation and discharged in the event of pump malfunction, as shown in U.S. Pat. No. 3,638,528, both patents being assigned to the common assignee of the invention. It is with respect to the brake booster of the latter patent that this invention is more particularly directed. In the braking system illustrated in U.S. Pat. No. 3,638,528, it is important that the accumulator have sufficient charge or fluid pressure reserve to effect several brake applications should the main system pressure source fail. Under field conditions of operation, experience shows that temperature variations in the ambient environment may alter the stored accumulator charge, i.e. the fluid pressure and/or volume, so that the charge is ineffective for making a brake application. This invention obviates one shortcoming of the prior art by compensating for thermal expansion of the stored hydraulic fluid, thus minimizing the likelihood of an inadequate charge when needed.

SUMMARY OF THE INVENTION

An object of this invention is to provide a hydraulic fluid pressure storage vessel including a device for storing an increase in volume of fluid above a predetermined measured volume at a given temperature where the volumetric increase is caused by a rise in temperature of the stored fluid.

Another object of this invention as to provide a hydraulic fluid pressure storage vessel having composite piston means which provides for retention of a measured volume of fluid stored at a given temperature despite expansion of said measured volume due to an increase in temperature of the sotred fluid above the given temperature.

A further object of this invention is to provide a hydraulic fluid pressure storage vessel including concentric piston means having differential areas exposed to a variable volume chamber in which a measured volume of fluid is stored at a given temperature, and further including spring means, acting on the piston having the smaller of the differential areas and yieldable to an increase in volume of fluid above the measured volume for enlarging the chamber to receive the increase in volume to compensate for thermal expansion.

A principal object of the invention is to provide a hydraulic accumulator having concentric relatively movable differential area pistons exposed to a variable volume chamber for storing a measured volume of fluid under pressure at a given temperature so that any increase in said measured volume due to thermal expansion of the confined fluid will act on said differential pistons to move one with respect to the other to compensate for the volumetric increase.

DESCRIPTION OF THE DRAWING

FIG. 1 is a schematic view of a hydraulic system associated with an automotive vehicle incorporating the teachings of the invention with a brake boost mechanism;

FIG. 2 is an enlarged longitudinal sectional view of a pressure vessel constructed according to the invention taken along the line 2—2 of FIG. 1; and FIG. 3 is a fragmentary sectional view of the storage vessel of FIG. 2, showing the relationship of the parts when charged.

DETAILED DESCRIPTION

Since the invention is especially adaptable to certain types of vehicle hydraulic power brake systems, it will be illustrated and briefly described with such a system in order to better emphasize the advantages of the invention. Referring now to FIG. 1 depicting a vehicle hydraulic system, the reference numeral 10 designates a power brake boost mechanism connected in series flow relationship between an engine driven pump 12 and a steering gear mechanism 14. The outlet or pressure side of the pump 12 is communicated to an inlet port 16 of the boost mechanism 10 via conduit 18 to provide the mechanism with its main fluid pressure source. A line 20 connects an outlet 22 of the brake booster 10 to the steering gear 14. A return line 24 is connected between an outlet 26 of the steering gear and the pump 12. A fluid connection 28 communicates an exhaust port 30 of the brake boost mechanism with the return line 24. The boost mechanism 10 is equipped with an accumulator 32 which provides an auxiliary source of fluid supply in the event of pump failure. The auxiliary source furnished by the accumulator or fluid pressure vessel 32 is a standby source which is introduced or connected into the system upon failure of the main or primary source of fluid supplied directly by the engine pump. Pressurization of hydraulic fluid within the vessel 32 and release of fluid therefrom when needed is controlled by a charging valve 34 interposed between the brake booster inlet 16 and the vessel 32. As shown in FIG. 1, the inlet 16 which communicates with the engine pump, opens into an annular groove 36 of spool valve 38 of the boost mechanism 10. The charging valve 34 is housed in a bore 40 which connects the annular groove 36 to the accumulator 32. The charging valve 34 includes a valve seat 42 formed in an element 43 secured in the bore 40 and having a passage 44 extending axially of the element 43. A valve member 46, slidably positioned in the bore 40, is urged against the valve seat 42 by a spring 48 to close the passage 44. The spring 48 is preloaded between the valve member 46 and a metering member 50, the latter of which abuts a tube seat 52. The tube seat 52 is adapted to be connected to a conduit 54 which connects the bore 40 to the accumulator 32. The metering member 50 is provided with a plurality of radial passages 56 and a restrictive orifice 58 for regulating the volume of fluid passing into the accumulator 32. A valve actuating plunger 60 is slidably received in the lower portion of the bore 40. The plunger is formed with longitudinally extending channels 62 to permit flow of fluid through the bore 40 and a stem 64 at its upper end which projects through the passage 44 for engagement with the valve member 46 when the plunger is forced upwardly. Upward movement of the plunger 60 is initiated by shifting the spool valve 38 until cam surface 66 of the spool valve 38 engages the lower end of the plunger 60 forcing the plunger and its stem 64 to unseat the valve member 46, thereby releasing accumulator pressure into the annular groove 36. For details of the construction and operation of the power brake boost mechanism 10 and associated charging valve 34 which introduces an auxiliary fluid source when needed to actuate the boost mechanism, see U.S. Pat. No. 3,638,528, owned by the assignee of the present invention and incorporated herein by reference.

The accumulator 32 of the herein disclosed invention represents an improvement over the accumulator disclosed in U.S. Pat. No. 3,283,786, assigned to the common assignee of this invention and referenced in the above noted U.S. Pat. No. 3,638,528, as being a component part of the system therein disclosed. The pressure vessel or accumulator 32 includes a hollow body or housing 68 closed at one end by a cap 70 threadedly secured to the housing and forming therewith a fluid pressure storage chamber 72 of variable volume. Composite piston means 74 is slidably received within the variable volume chamber 72 to provide for changes in system pressure and also for thermal expansion of the fluid trapped within the chamber. The cap 70 is provided with a port 76, opening into the variable volume chamber, which is connected to the engine driven pump 12 via line 54, bore 40 and inlet port 16. The composite piston means 74 comprises two concentric pistons 78 and 80 having differential areas exposed to the variable volume chamber 72 to be acted upon by the fluid pressure stored in the chamber. A seal 82 prevents leakage from the chamber between the relatively movable outer and inner pistons 78 and 80 respectively. A seal 84 prevents leakage from the chamber 72 between the outer piston 78 and the cap 70. The outer piston 78 is provided with an axial extending hollow skirt portion 86 in which a shoulder 88 is formed. The shoulder 88 forms an abutment against which the inner piston 80 is urged by the fluid under pressure stored in the chamber 72. Resilient means 90, located within the hollow housing 68, acts against the composite piston means 74 opposing the force of the fluid pressure acting in the chamber 72. An abutment ring 92 is secured interiorly of the hollow housing for engagement with a flange 94 integral with the skirt 86 of the outer piston 78, to thereby locate the composite piston means 74 in the chamber 72 when the latter is not pressurized. The resilient means 90 is shown as a coil spring preloaded between a retainer plate 96 and the flange 94. The plate 96 rests on an end section 98 of the housing 68, with the central portion 100 of the end section open so that the interior portion 102 is communicated to atmosphere. A central tube 104 is supported at one end on the retainer plate 96. The other end of the tube projects axially inwardly of the hollow housing to provide a stop means for composite piston means 74. This stop, against which the composite piston means abuts, locates the piston means so as to define a fluid storage chamber of a preselected volume, as shown in FIG. 3, which will accommodate a measured quantity or volume of fluid within a given pressure range as determined by the relationship of the differential areas of the pistons, the preload of the spring 90 and the rating of the engine driven pump 12. The fluid pressure storage requirement of the accumulator 32 must be matched with the pump rating and system demands for emergency operation of the brake boost mechanism 10. When the composite piston means 74 engages the stop 104, the pressure in the chamber 72 will continue to build up until the chamber pressure is substantially that of the system pressure, as developed by the pump, without causing relative movement between the pistons 78 and 80, since the preload on the spring 90 now opposes movement only of the outer piston 78, the inner piston now being held by the stop 104, having a much smaller differential area over which the chamber pressure acts. Therefore, initial engagement between the stop and the composite piston means establishes a fixed or measured amount of hydraulic fluid in the chamber 72 at a minimum pressure, thus fixing the lower end of the system pressure range. Any further build up in chamber pressure up to the point where maximum system pressure acts in the chamber without causing relative movement between the pistons 78 and 80, fixes the upper end of the range. Fluid expansion of the stored fluid in the chamber 72 due to temperature rise is effective over the differential area between the inner and outer pistons, the inner piston being nulled, to position the outer piston as shown in dotted outline of FIG. 3, thus retaining the fluid within the vessel for subsequent use.

MODE OF OPERATION

Assuming a situation in which the vehicle engine driven pump 12 is shut down and the hydraulic system of FIG. 1, including the fluid storage vessel 32 are unpressurized, the composite piston means 74 will be urged against the abutment ring 92 by the resilient means 90, as shown in FIG. 2. Starting the vehicle engine drives the pump 12 which pressurizes the hydraulic system to which the storage vessel 32 is connected through the charging valve 34. The fluid pressure admitted to the variable volume chamber 72 is effective over the composite piston means 74 urging it against the preloaded resilient means 90. As the pressure in the chamber builds up to exceed the force of the resilient means the composite piston means moves outwardly allowing the volume of fluid in the chamber 72 to increase. This outward movement of the composite piston against the resilient means increases the force of the resilient means so that the pressure of the stored volume of fluid is likewise increased. The volume of fluid to be stored and the pressure at which the fluid is stored in the chamber continue to increase until the composite piston means 74 abuts the stop 104. Upon initial engagement of the piston means with the stop, there is a predetermined or measured volume of fluid in the chamber at a prescribed minimum pressure, as dictated by the system requirements. At the time of initial engagement of the composite piston means with the stop, the inner piston of the composite piston means is held of nullified from further movement. However, before engagement of the piston means with the stop, the pressure of the stored fluid which is acting on the composite piston means is opposed only by the resilient means but after engagement with the stop the resilient means is relieved of the force acting on the inner piston having the larger differential area, thus enabling the resilient means, now opposing only the force developed on the outer piston having the smaller differential area, to balance a chamber pressure, having a maximum value in excess of the prescribed minimum pressure required to move the composite piston means against the stop. The maximum value of this selected pressure in the chamber 72 is determined by the differential area between the outer and inner pistons 78 and 80 respectively, of the composite piston means 74 and is slightly greater than maximum system pressure. Basing the composite piston design on an elevated pressure slightly greater than maximum system pressure provides a margin of safety above the maximum system pressure so that the inner and outer pistons will remain in static relationship with respect to each other during normal operation.

If during a parked condition of the vehicle with full accumulator charge, as shown in full lines FIG. 3, the temperature of the stored fluid should rise a given amount, the resultant pressure increase due to fluid expansion is effective over the differential area between the outer and inner pistons to move the outer piston, as shown in dotted lines FIG. 3, to compensate for the volumetric increase of the fluid in the chamber. Moreover, the increase in volume of fluid is retained in the chamber for subsequent release to the system during an emergency.

I claim:

1. A vessel for storing fluid under pressure comprising:
   a hollow housing having a closed end connectible to a fluid pressure source;
   composite piston means including first and second relatively movable portions, said composite piston means being slidably disposed in the housing and forming a variable volume chamber with the closed end;
   resilient means engaging the first portion of the composite piston means and urging the composite piston means toward the closed end; and
   stop means against which the second portion of the composite piston means is urged when the pressure and volume of fluid in the chamber have attained predetermined values respectively;
   said composite piston means being responsive to an increase in volume of fluid above said predetermined volume to increase the volume of said chamber to compensate for fluid expansion due to temperature rise.

2. A vessel according to claim 1 wherein said first and second portions of the composite piston means comprises two relatively movable pistons having differential areas exposed to the chamber to be acted upon by the fluid stored in the chamber.

3. A vessel according to claim 2 wherein said two pistons are concentrically located in the housing so that one of the pistons abuts the stop means and the other piston is resisted by the resilient means to further movement when said predetermined values are attained.

4. A vessel according to claim 3 wherein the piston which abuts the stop means has the larger area and the piston resisted by the resilient means has the smaller area;
   said resilient means resisting movement only of the piston having the smaller area after the piston with the larger area abuts the stop so that the resilient means will now resist a chamber pressure acting on the smaller area piston which is in excess of said predetermined pressure value preventing relative movement between the pistons.

5. A vessel according to claim 4 wherein said resilient means is a coil spring located in the housing and preloaded between the housing and the piston with the smaller area.

6. A vessel according to claim 5 wherein said stop means includes a tube member concentric of the coil spring and projecting inwardly of the hollow housing for abutting the piston with the larger area.

7. A vessel for storing fluid under pressure comprising:
   a hollow housing having a fluid pressure chamber in one end thereof;
   inner and outer concentrically arranged pistons slidably received in the hollow housing, with each piston having an end exposed to the chamber;
   preloaded spring means in the housing interposed between the housing and the outer piston and urging the pistons into the chamber; and
   stop means against which the inner piston is urged to define in conjunction with the outer piston a prescribed volume of fluid trapped in the chamber at a predetermined minimum pressure;
   said inner and outer pistons being relatively movable to compensate for fluid expansion of the trapped volume of fluid caused by temperature rise;
   said spring means being effective to prevent relative movement between the pistons up to a given chamber pressure above which said spring means yields, permitting movement of the outer piston.

8. A vessel according to claim 7 wherein said outer piston includes a hollow skirt provided with a shoulder against which the inner piston abuts when acted upon by the chamber pressure up to said given value beyond which said shoulder moves out of abutment with the inner piston.

9. A vessel according to claim 8 wherein the stop means includes a tube located centrally in the housing and extending axially of the hollow skirt for limiting movement of the inner piston.

10. A vessel according to claim 8 wherein said inner and outer piston ends exposed to the chamber have differential areas which have been preselected so that said pistons will move together as one when exposed to chamber pressure up to said given value.

* * * * *